O. C. PHELPS, dec'd.,
J. J. TOWER, Assignee by mesne assignments.
HANDCUFFS.
No. 7,873. Reissued Sept. 4, 1877.
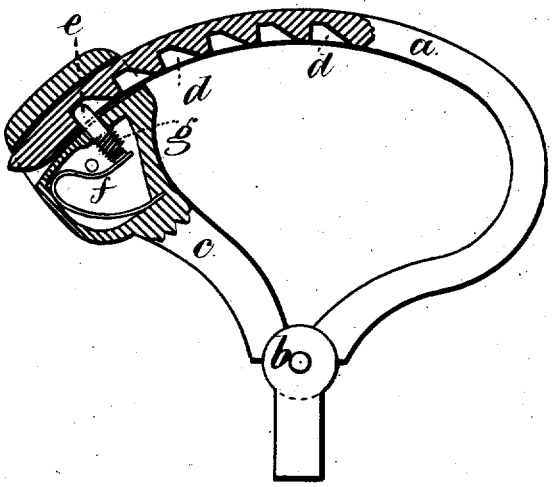
Witnesses
Chas. H. Smith
Harold Serell
Inventor
O. C. Phelps.
John J. Tower, Assignee
per Lemuel W. Serell
Atty.
N. PETERS, PHOTO-LITHOGRAPHER, WASHINGTON, D. C.

UNITED STATES PATENT OFFICE.

JOHN J. TOWER, OF BROOKLYN, NEW YORK, ASSIGNEE, BY MESNE ASSIGNMENTS, OF ORSON C. PHELPS, DECEASED.

IMPROVEMENT IN HANDCUFFS.

Specification forming part of Letters Patent No. 56,463, dated July 17, 1866; Reissue No. 7,873, dated September 4, 1877; application filed August 4, 1877.

*To all whom it may concern:*

Be it known that, O. C. PHELPS, formerly of the city, county, and State of New York, now deceased, did invent certain Improvements in Adjustable Handcuffs and Shackles, and the following is declared to be a correct description of the same.

Heretofore handcuffs have been made consisting of a segment-bar connected with a permanent radial bar, so curved as to form a section of a handcuff, the center of the radius being a joint that connected another curved bar therewith, which had a mortise through it for the segment-bar to pass through.

In these particulars this improvement is similar to said previous device. The bolt of the lock, being formed of a part of the spring, and acting at the outer side of the segment, was insecure and easily picked. These improvements are to remedy these defects and render the handcuff more secure, lighter, and more compact, while retaining all its efficiency.

The segment-piece *a* has recesses or notches *d* on the inner or concave side, next the wrist or joint *b*, and the lock is located in a recess between the segment and the center-joint *b* in the movable radius-arm *c*, the portion of the movable arm beyond the mortise through which the segment passes being only just large enough for strength, and rounded off, so as to afford no projection for prying off the handcuff; and the catches being on the concave side, next the wrist, prevents the insertion of anything to spring the bolt in that direction. As a further security, the lock is formed of a spring-bolt, actuated by a spring that forms no part thereof. This bolt *e* is forced outward in a radial line by a spring, *f*, there being a light spiral spring, *g*, to retract it when the spring *f* is forced back by the key. By this construction and arrangement of the parts the lock is brought into direct contact with the wrist, and the parts are compact, so as to add greatly to the security of the handcuff and improve its construction, by rendering it lighter and stronger.

Before the present invention handcuffs had been made with a lock at the end of one of the swinging sections, into which the end of the other section passed.

What is claimed as the invention of said PHELPS is—

1. A handcuff having a segmental bar, *a*, with notches in the inner face and a swinging radius-bar, with the locking mechanism in said bar, between the center-joint and the segmental bar, substantially as set forth.

2. In a handcuff, the combination, with the segmental bar having notches in the inner surface, of a radius-bar having a hole entirely through it for the passage of the segmental bar, and containing the lock, substantially as set forth.

Signed by me this 20th day of July, A. D. 1877.

JOHN J. TOWER.

Witnesses:
GEO. T. PINCKNEY,
WILLIAM G. MOTT.